United States Patent
Zheng et al.

(10) Patent No.: US 12,523,739 B2
(45) Date of Patent: Jan. 13, 2026

(54) SYSTEM WITH ACCESS POINT AND DIRECTIONAL ANTENNA

(71) Applicant: Hewlett Packard Enterprise Development LP, Spring, TX (US)

(72) Inventors: Jiguang Zheng, Beijing (CN); Hongli Zhang, Beijing (CN); Hailong Bai, Beijing (CN); Yue Sun, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 418 days.

(21) Appl. No.: 18/162,048

(22) Filed: Jan. 31, 2023

(65) Prior Publication Data
US 2024/0255606 A1 Aug. 1, 2024

(51) Int. Cl.
| | |
|---|---|
| *G01S 5/04* | (2006.01) |
| *G01R 29/10* | (2006.01) |
| *G05F 1/46* | (2006.01) |
| *H03K 17/56* | (2006.01) |
| *H04W 88/08* | (2009.01) |

(52) U.S. Cl.
CPC ................ *G01S 5/04* (2013.01); *G01R 29/10* (2013.01); *G05F 1/46* (2013.01); *H03K 17/56* (2013.01); *H04W 88/08* (2013.01)

(58) Field of Classification Search
CPC .. G01S 5/04; G01R 29/10; G05F 1/46; H03K 17/56; H04W 88/08; H01Q 1/007
See application file for complete search history.

(56) References Cited

U.S. PATENT DOCUMENTS

| | | | |
|---|---|---|---|
| 6,868,255 B1 | 3/2005 | Chanteau et al. | |
| 7,626,576 B2 | 12/2009 | Anandakumar et al. | |
| 7,738,596 B2 | 6/2010 | Lin et al. | |
| 9,294,320 B2 | 3/2016 | Shimizu et al. | |
| 9,710,423 B2 | 7/2017 | Sengoku | |
| 10,629,989 B2 | 4/2020 | Tennant et al. | |
| 10,794,972 B2 | 10/2020 | Biber | |
| 10,903,567 B2 | 1/2021 | Vehovc et al. | |
| 2006/0280270 A1 | 12/2006 | Ibrahim et al. | |
| 2011/0148594 A1 | 6/2011 | Kang | |
| 2020/0007181 A1* | 1/2020 | Stählin | H04B 1/3822 |
| 2021/0273775 A1* | 9/2021 | Zheng | H04L 7/0008 |

* cited by examiner

*Primary Examiner* — Zhitong Chen
(74) *Attorney, Agent, or Firm* — Hewlett Packard Enterprise Patent Department

(57) ABSTRACT

Implementations of the present disclosure relate to a system comprising an access point (AP), an antenna module and a radio cable. The AP includes a modulator configured to receive a clock signal and a power voltage and modulate them into a modulated power. The radio cable is configured to transmit the modulated power. The antenna module comprises a directional antenna, a demodulator configured to demodulate the modulated power into a demodulated clock signal, and a sensor configured to receive the demodulated clock signal and the modulated power. With the system of the present disclosure, the compass/declinometer sensors can be deployed on the panel antenna, so as to obtain the location, the direction and the coverage of the panel antenna. Further, the radio frequency cables can be used to transmit the power and clock signal between the sensor and the AP, and there is no need to provide dedicated cables.

18 Claims, 7 Drawing Sheets

SYSTEM WITH ACCESS POINT AND DIRECTIONAL ANTENNA

BACKGROUND

As Wi-Fi 6E develops, an access point (AP) with a passive antenna (such as a passive 6 GHz antenna) needs to meet auto frequency coordination (AFC) requirement, especially for outdoor standard power AP. Not only the location but also the 6 GHz antenna direction and the coverage area need to be reported as well. Thus, taking the AFC requirement and radio frequency (RF) visualizations, or other factors into consideration, digital compass/declinometer sensors become necessities at the passive antennas.

BRIEF DESCRIPTION OF THE DRAWINGS

Through the following detailed descriptions with reference to the accompanying drawings, the above and other objectives, features, and advantages of the example implementations disclosed herein will become more comprehensible. In the drawings, several example implementations disclosed herein will be illustrated in an example and in a non-limiting manner, where.

DETAILED DESCRIPTION

Figure 1:
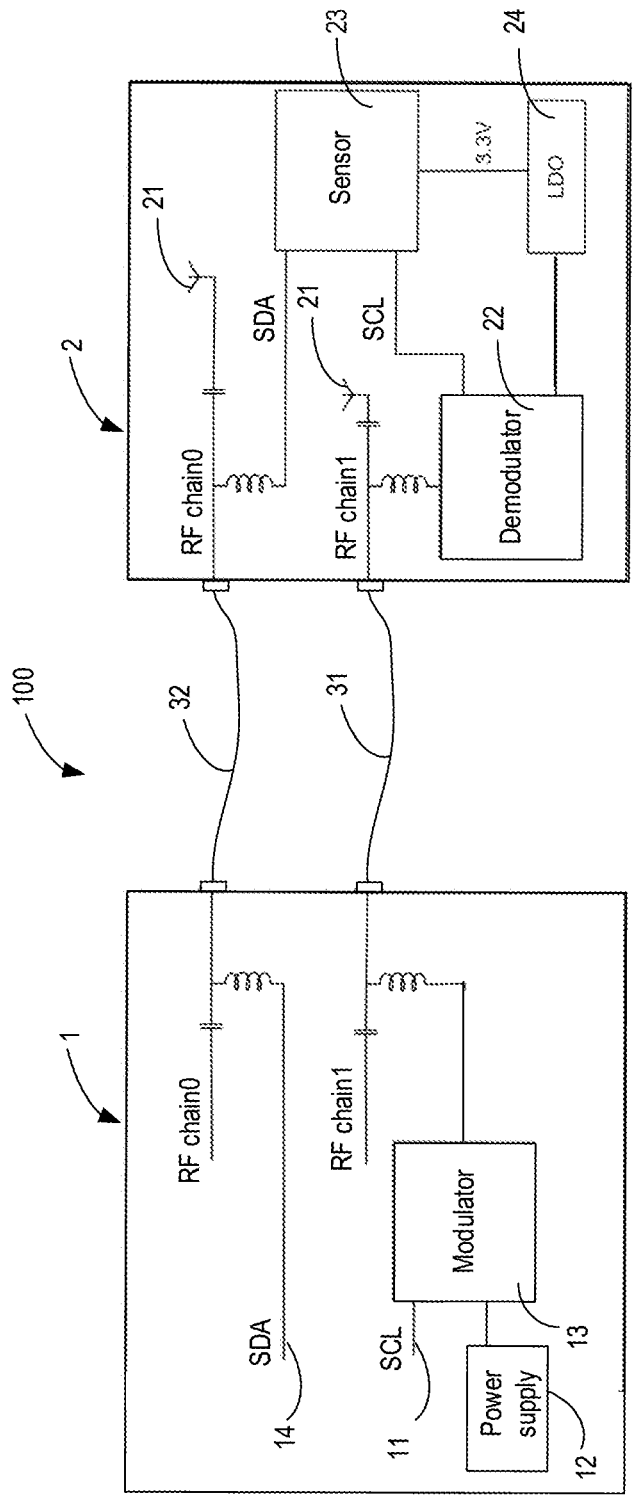
FIG. 1 illustrates a block diagram of the system including an AP and a passive antenna in accordance with some example implementations of the present disclosure.

Traditionally, there is no power and digital interface for the sensors in the antenna module, such as digital compasses and declinometers. Thus, the sensor cannot be powered to sense the directional antenna (such as the 6 GHz antenna), and data cannot be transmitted between the 6 GHz antenna and the AP. When the digital compass or declinometer is installed on a 6 GHz antenna outdoors to sense the location, the direction and the coverage area and the like of the 6 GHz antenna, the sensor needs to be supplied with electrical power so as to sense the directional 6 GHz antenna. The data sensed by the sensor should be transmitted to the AP indoors. Although the wireless communication, such as Blue Tooth, is widely used to transmit data, the wireless communication will be negative for regulatory and introduce a security risk, and cannot be used to power the sensors. It would be beneficial to transmit the data and supply the power through cables.

Generally, the outdoor device needs to withstand harsh weather and at least should be waterproof. If new dedicated cables are used to transmit the sensed data and supply power to the sensors, on the one hand, the installation process for the dedicated cable will be more complicated and thus the cost will be increased. On the other hand, the dedicated cable will also increase the risk of water leakage.

The RF cable is designed to transmit and receive the RF signal, which is of the frequency from 2.4 GHz to 6 GHz, between the indoor AP and the outdoor antenna. If the data sensed by the sensor and the power supplied to the sensor can be transmitted over the existing RF cables, there is no need for any dedicated cable, thereby simplifying the installation process and reducing the cost and the risk of water leakage.

To address the problems in the typical design as discussed above, example implementations of the present disclosure propose a solution for transmitting both power and desired signal (such as a clock signal) through a single existing radio cable without dedicated cables. Thus, the present disclosure can power a compass/declinometer sensor in an antenna (such as a 6 GHz antenna) in the open air for automated frequency coordination (AFC) and radio frequency (RF) visualizations. Further, the present disclosure further can transmit data between the outdoor passive antenna and the indoor AP.

The AP is a networking device that allows wireless-capable devices to connect to a wired network. With the development of the wireless communication technology, the AP is provided with a multiple input multiple output (MIMO) system, so as to improve the transmission rate and bandwidth utilization of information. Corresponding, the AP is provided with a plurality of front-end modules (FEMs). Communications between the AP and the wireless-capable devices may operate according to wireless communication protocols such as the Institute of Electrical and Electronic Engineers (IEEE) 802.11 standards, Wi-Fi Alliance Specifications, or any other wireless communication standards. The IEEE 802.11 standards may include the IEEE 802.11ay standard (e.g., operating at 60 GHz), the IEEE 802.11ad standard (sometimes referred to as "WiGig"), the IEEE 802.11be (referred to as "WIFI 7") or any other wireless communication standards.

FIG. 1 illustrates a block diagram of the system 100, including an AP and a passive antenna, in accordance with some example implementations of the present disclosure. As discussed above, there is no power supply at the passive antenna (such as, a passive 6 GHz antenna). If sensors, such as digital compasses and declinometers, are provided on the passive antenna (such as, the passive 6 GHz antenna) to sense the location, the direction, and the coverage of the antenna, the sensors should be supplied with electrical power to work, and further, the sensed data will be transmitted to the AP.

Further, there should be a proper interface for transmitting and receiving data or for receiving electrical power. The I2C interface is a powerful bus used for communication between a master (or multiple masters) and a single or multiple slave devices. The physical I2C interface consists of the serial clock (SCL) and serial data (SDA) lines. The slave circuit design is quite simple, and the I2C interface is compatible with most sensors. If a universal asynchronous receiver/transmitter (UART) interface is selected for the sensor, a microprogrammed control unit (MCU) in the antenna should be provided such that the cost is increased significantly and the stability of the system will be reduced accordingly. If a Serial Peripheral Interface (SPI) interface is selected for the sensor, four RF cables should be provided, whereas two RF cables are enough for the I2C interface, since the I2C interface has serial clock (SCL) and serial data (SDA) lines. In some example implementations of the present disclosure, the sensor is provided with an I2C interface to transmit and receive data or electrical power. Accordingly, the AP is provided with a corresponding SCL line for transmitting a clock signal and a corresponding SDA line for transmitting and receiving data.

As illustrated in FIG. 1, the system 100 includes an AP 1 and an antenna module 2, wherein the antenna module 2 is provided with at least one directional antenna 21 (such as a passive 6 GHz antenna) and at least one sensor 23 to sense the location, the direction and the coverage and the like of the 6 GHz antenna. The at least one sensor 23 are powered by electrical power from the AP 1. As illustrated in FIG. 1, the directional antenna 21 is, for example, a passive direction antenna that can generate information about the direction thereof. In some implementations, the directional antenna 21 may be an external 2×2 6 GHz panel antenna including two directional antennas, and accordingly, two RF cables are used to connect the two directional antennas with the corresponding terminals on the AP 1, respectively. Although the antenna 21 as illustrated in FIG. 1 is separated from the AP 1, the 6 GHz antenna can be an internal antenna of the AP 1. In this case, a modulator 13 and a demodulator 22, which will be described hereinafter, may be integrated with the AP 1, and the radio cables are also provided inside the AP 1.

Since the sensor 23 is provided with an I2C interface, data can be transmitted over the SDA line, and the clock signal can be transmitted over the SCL line. Accordingly, the AP 1 is provided with corresponding lines to communicate with the sensor 23. As illustrated in FIG. 1, the AP 1 includes a clock line 11, such as an SCL line of the I2C interface. The clock line 11 is configured to transmit or generate a clock signal having alternate high power level and low power level. The clock signal may be transmitted to at least one sensor 23 provided on the antenna module 2 so as to sample the data sensed by the sensor 23.

As illustrated in FIG. 1, the AP 1 further includes a data line 14, such as aN SDA line of the I2C interface. The SDA line 14 is configured to send a request to the sensor to request data sensed by the sensor 23 and then receive the sensed data from the sensor 23, such as information about the location, the direction and the coverage area of the directional antenna 21. The sensed data received from the sensor 23 may be processed by the AP 1.

Continue to refer to FIG. 1, the AP 1 further includes a power supply 12 configured to output a power voltage. The power supply 12 may be a power supply for the electronic devices on the AP and outputs a voltage, for example, in the range from 3V to 5V. In some implementations, the power voltage may have a high voltage, for example, 5V, and a low voltage, for example, 4.2V. In other implementations, the power voltage may have only one voltage, for example, 5V. The electrical power generated from the AP 1 is supplied to the sensor 23 provided on the antenna module 2 to power the sensor 23.

As discussed above, dedicated cables for transmitting the data and the clock signal may increase the risk of water leakage. In implementations of the present disclosure, the RF cables, designed for transmitting RF signal between the AP 1 and the antenna module 2, may be used to transmit the power and signal which will be used by the sensor 23. In implementations of the present disclosure, two cables are used for the 2×2 panel antenna.

As illustrated in FIG. 1, the AP 1 further comprises a modulator 13 connected to the clock line 11 and the power supply 12 so as to receive the clock signal and the power voltage. The modulator 13 is configured to modulate the clock signal and the power voltage into a single modulated power. Since the clock signal has alternate high voltage and low voltage, the modulated power, modulated from the power voltage and the clock signal, has high power voltage and low power voltage alternated with each other. Accordingly, the modulated power may have the same frequency or duty cycle as the clock signal.

As illustrated in FIG. 1, the modulated power is transmitted to the antenna module 2 over a radio cable 31, for example, a first RF cable, which is one of two cables designed for the 2×2 panel antenna. As illustrated in FIG. 1, the sensed data is transmitted to the AP 1 through the other radio cable 32, for example, a second RF cable, which is the other of two cables designed for the 2×2 panel antenna. The RF cable is configured to transmit the radio frequency signal, typically having the frequency from 2.4 GHz to 6 GHz. Meanwhile, the clock signal typically has the frequency from 50 kHz to 500 kHz, which is much less than that of the RF signal. Since the RF choke can provide good isolation between I2C and RF signals, there is no interference between the modulated power and the RF signal. Therefore, the modulated power and the RF signal can both be transmitted over a single RF cable without interference with each other. By providing this modulator 13, the desired signal (such as a clock signal) and power voltage can be modulated together to one signal, and then the modulated signal can be transmitted over one RF cable simultaneously. Therefore, one RF cable can be used to transmit the clock signal and power voltage, and the other RF cable can be used to transmit sensed data, and two cables will be enough for the sensors provided with the I2C interface.

The modulated power is transmitted to the antenna module 2 over the radio cable 31 so as to power the sensor 23. However, the modulated power cannot be used as the clock signal for the sensed data of the sensor 23. As illustrated in FIG. 1, the antenna module 2 further includes a demodulator 22 connected to the radio cable 31 and configured to receive and demodulate the modulated power into a demodulated clock signal. The demodulated power has the same frequency or duty cycle as the clock signal, and thus reproduces the clock signal to a large extent. The demodulated clock signal is received by the sensor 23 so as to sample the sensed data. The sensor 23 is further powered by the modulated power so as to sense the location, the direction and the coverage and the like of the 6 GHz antenna.

As illustrated in FIG. 1, the antenna module 2 is further provided with a Low Dropout Regulator (LDO) 24 configured to receive the modulated power and transform the alternate high voltage and low voltage to a constant voltage, for example, 3.3V. Since the power supply for the sensor 23 is a constant voltage, the constant voltage may be supplied to the sensor 23 to power the sensor 23.

Although the modulator 13 as illustrated in FIG. 1 is provided on or integrated with the AP 1, the modulator 13 may be separated from the AP, 1 and formed as a part of a separated circuit module, and then connected to the AP when in use. Although the demodulator 22 as illustrated in FIG. 1 is provided on or integrated with the antenna module 2, the demodulator 22 may be separated from the antenna module 2, and formed as a part of the separated circuit module. The separated circuit module is separated from the AP 1 and the antenna module 2, and may include the modulator 13 and a demodulator 22. When the circuit module is used together with the AP 1 and the antenna module 2, the modulator 13 may be connected between the AP 1 and the radio cable 31, and the demodulator 22 may be connected between the radio cable 31 and the antenna module 2. The modulator 13 receives a clock signal and a power voltage from the AP 1 and modulates the clock signal and the power voltage into a modulated power to be transmitted over the radio cable 31. The demodulator 22 receives the modulated power from the radio cable 31 and demodulates the modulated power into a demodulated clock signal to be transmitted to the sensor 23 in the antenna module 2 so as to sample the sensed data.

In the system 100 according to the present disclosure, it is possible to deploy compass/declinometer sensors on a 6 GHz panel antenna for AFC requirement and RF visualizations, so as to obtain the location, the direction and the coverage area and the like of the 6 GHz antenna. Further, by providing the modulator in the AP and the demodulator in the antenna module, the desired signal (such as a clock signal) and the power voltage can be modulated at the modulator into a single modulated power. The single modulated power can be transmitted to the antenna module over one single RF cable, and then the modulated power received from one single RF cable can be demodulated at the demodulator to a clock signal. Thus, a single existing RF cable, which is designed to transmit the RF signal, can be used to transmit a modulated power, and there is no necessity to provide a dedicated cable to transmit the clock signal and another dedicated cable to supply the power voltage to the sensor. Therefore, the installation process can be simplified, the cost can be significantly reduced, and the risk of water leakage can be reduced.

Figure 2:
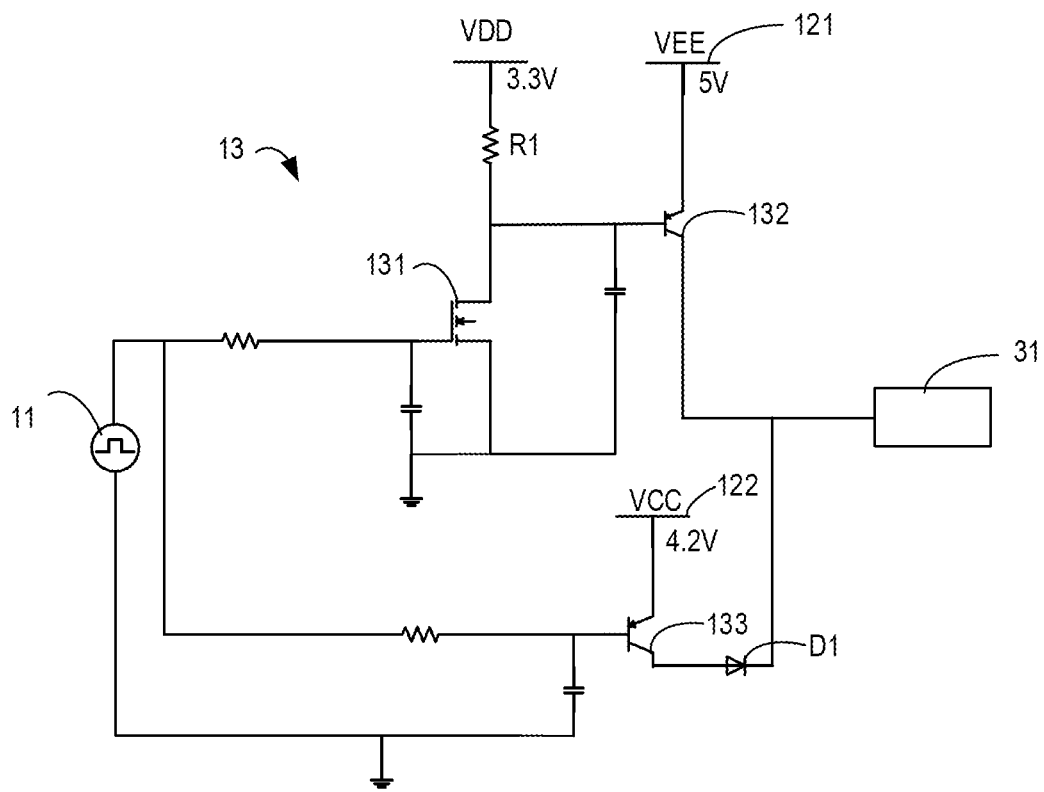
FIG. 2 illustrates an example circuit of a modulator in accordance with some example implementations of the present disclosure.
Figure 3:
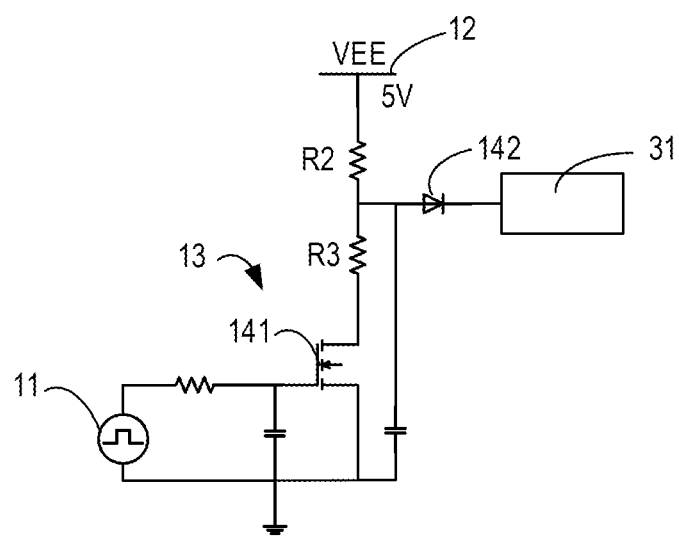
FIG. 3 illustrates another example circuit of a modulator in accordance with some example implementations of the present disclosure.
Figure 4A:
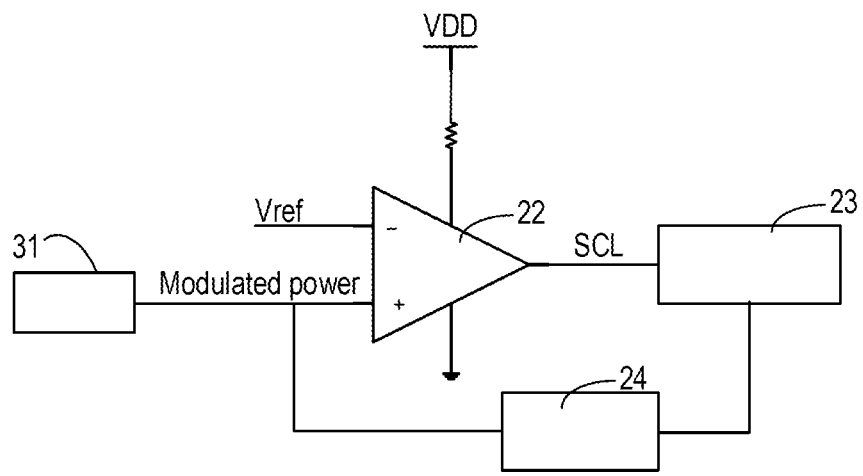
FIG. 4A illustrates an example structure of an antenna module in accordance with some example implementations of the present disclosure.
Figure 4B:
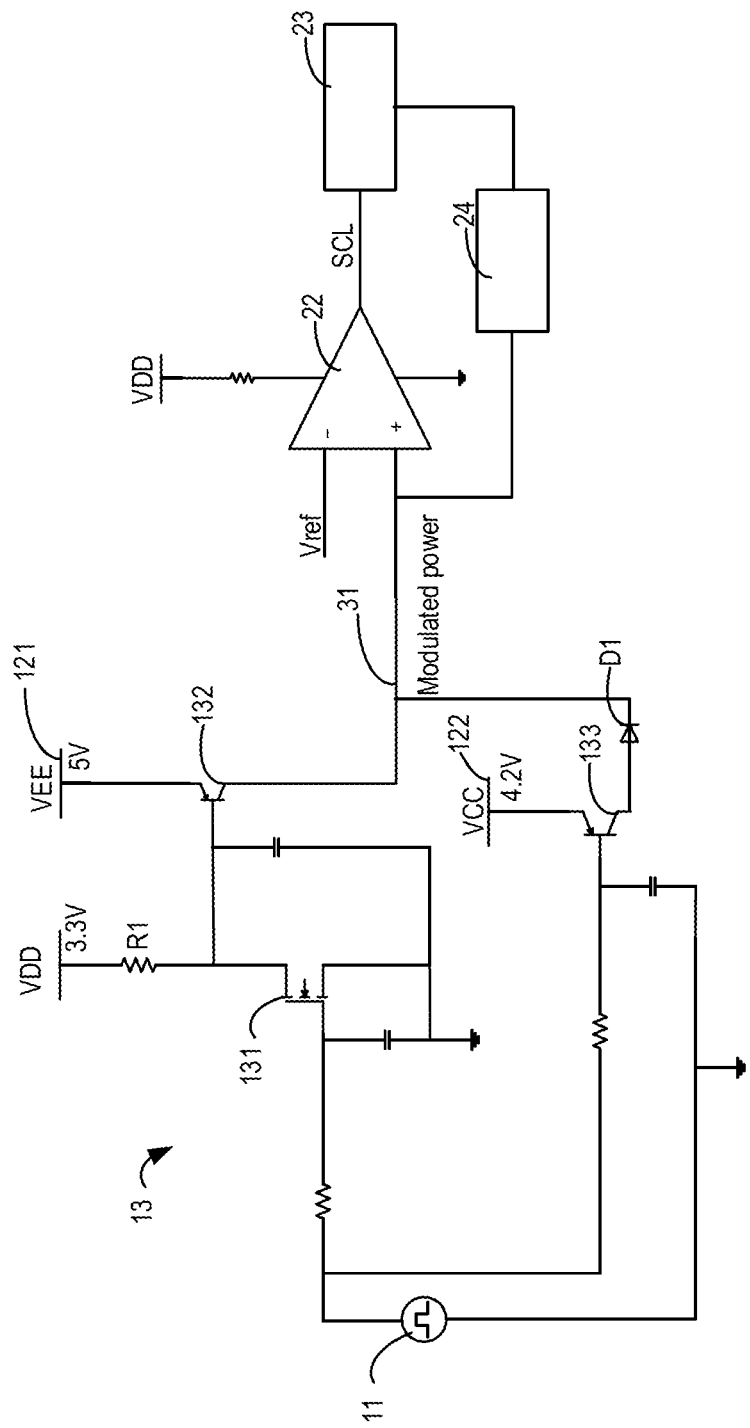
FIG. 4B illustrates an example connection of a modulator and a demodulator in accordance with some example implementations of the present disclosure.
Figure 4C:
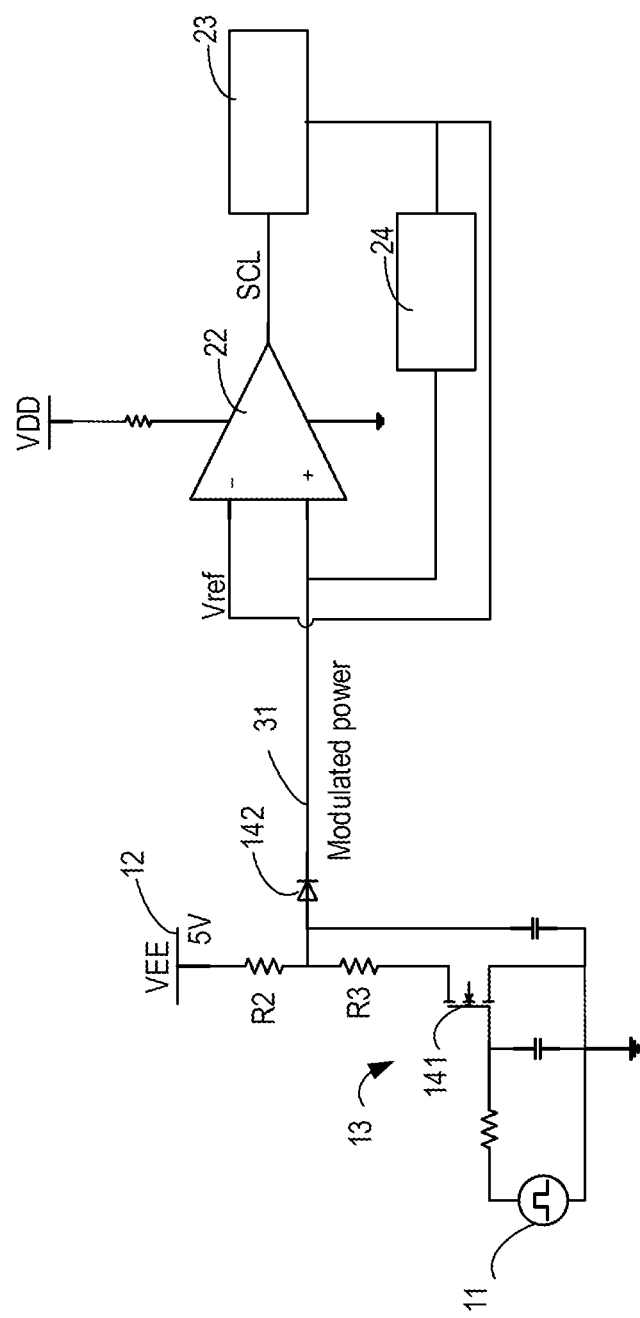
FIG. 4C illustrates another example connection of a modulator and a demodulator in accordance with some example implementations of the present disclosure.

FIG. 2 illustrates an example circuit of a modulator in accordance with some example implementations of the present disclosure. FIG. 3 illustrates another example circuit of a modulator in accordance with some example implementations of the present disclosure. FIG. 4A illustrates an example structure of the antenna module in accordance with some example implementations of the present disclosure. FIG. 4B illustrates an example connection of a modulator and a demodulator in accordance with some example implementations of the present disclosure. FIG. 4C illustrates another example connection of a modulator and a demodulator in accordance with some example implementations of the present disclosure.

Hereinafter, the detailed circuit of the modulator 13 in accordance with some example implementations of the present disclosure will be described in detail with reference to FIGS. 2 and 3. Further, the detailed structure of the demodulator and the connection between the modulator and the demodulator in accordance with some example implementations of the present disclosure will be described in detail with reference to FIGS. 4A to 4C.

In some implementations, as illustrated in FIG. 2, the power supply 12 includes a first power supply 121, shown as VEE having a voltage of 5V, and a second power supply 122, shown as VCC having a voltage of 4.2V. A first switch is connected between the first power supply 121 and the first radio cable 31, and a second switch is connected between the second power supply 122 and the first radio cable 31. When the voltage of the clock signal is high, the first switch is turned on whereas the second switch is turned off, and the modulated power at the first radio cable 31 thus is about 5V. When the voltage of the clock signal is low, the first switch is turned off whereas the second switch is turned on, and the modulated power at the first radio cable 31 thus is about 4.2V.

As illustrated in FIG. 2, the first switch includes an NMOS transistor 131 and a first triode 132. The gate of this NMOS transistor 131 is configured to receive the clock signal. The drain of this NMOS transistor 131 is electrically connected to a power supply, such as a power supply shown as VDD having a voltage of 3.3V, through a resistance R1, and the source of this NMOS transistor 131 is grounded. The first triode 132 is of PNP type. The base electrode of the triode 132 is connected between the drain of the NMOS transistor 131 and a second end of the resistance R1, wherein the first end of the resistance R1 is connected to the power supply having a voltage of 3.3V. The emitting electrode of the triode 132 is connected to a power supply, such as the first power supply having a high voltage of 5V, and the collecting electrode of the triode 132 is connected to the first radio cable 31. Although the first switch as illustrated in FIG. 2 includes a NMOS transistor and a diode, the switch can include other components, as long as the components can cause the high power voltage (for example, 5V) to be transmitted to the antenna module 2 through the radio cable 31 when the clock signal is at a high power level.

As illustrated in FIG. 2, the second switch includes a second triode 133, which is also of PNP type, and the base electrode of the triode 133 is configured to receive the clock signal. The emitting electrode of the triode 133 is connected to a power supply, such as the second power supply having a low voltage of 4.2V, and the collecting electrode of the triode 133 is connected to the first radio cable 31 through a diode D1 so as to prevent the current from flowing from the radio cable 31 to the collecting electrode of the triode 133. Although the second switch as illustrated in FIG. 2 includes a diode, the switch can include other components, as long as the components can cause the low power voltage (for example, 4.2V) to be transmitted to the antenna module 2 through the radio cable 31 when the clock signal is at a low power level.

When the voltage of the clock signal is high, the NMOS transistor 131 is turned on, and the electrical current can flow from the drain to the source thereof and thus flow through the resistance R1, and the voltage of the base of the first triode 132 is low and the first triode 132 is thus turned on. Meanwhile, due to the high voltage at the base of the second triode 133, the second triode 133 is turned off. Therefore, since the first triode 132 is turned on, the voltage at the first radio cable 31 is substantively equal to the high voltage of 5V.

When the voltage of the clock signal is low, the NMOS transistor 131 is turned off, and the electrical current cannot flow from the drain to the source thereof and thus cannot flow through the resistance R1, and the voltage of the base of the first triode 132 is high and the first triode 132 is thus turned off. Meanwhile, due to low voltage at the base of the second triode 133, the second triode 133 is turned on. Therefore, since the second triode 133 is turned on, the voltage on the first radio cable 31 is substantively equal to the low voltage of 4.2V.

As discussed above, the high voltage of 5V of the modulated power corresponds to high voltage of the clock signal, and the low voltage of 4.2V of the modulated power corresponds to low voltage of the clock signal. Thus, the power voltages are modulated with the clock signal to a modulated power, which has alternant high voltage of 5V and low voltage of 4.2V corresponding to alternant high and low voltage of the clock signal. By demodulating the modulated power, the demodulated signal may have the same frequency as that of the clock signal, that is to say, the demodulated signal may reproduce the clock signal. By simulation test, there is a time delay between the original clock signal and the demodulated clock signal. However, the time delay is much less than duration time of one cycle of the clock signal, and can be negligible with respect to the duration time of one cycle of the clock signal. In other implementations, the NMOS transistor may be replaced with MOSFET so as to further reduce the propagation delay between the original clock signal and the demodulated clock signal.

As illustrated in FIGS. 4A to 4C, the demodulator 22 may be a comparator, and one input terminal of this comparator is configured to receive the modulated power, and the other input terminal of this comparator is configured to receive a reference voltage Vref.

FIG. 4B illustrates the connection between the modulator of FIG. 2 and the antenna module of FIG. 4A. As illustrated in FIG. 4B, the collecting electrode of the triode 132 is connected to the one input terminal of the comparator through the first radio cable 31, and the collecting electrode of the triode 133 is connected to the one input terminal of the comparator through the diode D1 and the first radio cable 31.

The output terminal of this comparator is connected to the sensor 23. The reference voltage Vref may be a voltage between 5V and 4.2V. By comparing the modulated power and the reference voltage Vref, the output of the comparator at the output terminal can be at high level or at low level, which corresponds to the clock signal.

Referring to FIG. 3 illustrating another example circuit of the modulator, the power supply 12 includes one power supply having an output voltage, for example, 5V. The modulator 13 is electrically connected to the one power supply so as to generate the modulated power having alternate voltages, for example, the voltage of 3V and the voltage of 4.2V alternated with each other.

As illustrated in FIG. 3, the modulator 13 includes a diode 142 connected between the one power supply 12 and the first radio cable 31, wherein an anode of the diode 142 is connected to the one power supply, and a cathode of the diode 142 is connected to the first radio cable 31.

FIG. 4C illustrates the connection between the modulator of FIG. 3 and the antenna module of FIG. 4A. As illustrated in FIG. 4C, the cathode of the diode 142 may be connected to one input terminal of the demodulator 22 through the radio cable 31. In some implementations, the diode 142 may have a bias voltage of about 0.8V between the anode and the cathode.

Continue to refer to FIG. 3, an NMOS transistor 141, a resistance R2, and a resistance R3 may form a voltage controller that is configured to control a voltage at the anode of the diode 142. The gate of this NMOS transistor 141 is electrically connected to the clock signal. The drain of this NMOS transistor 141 is electrically connected to a power supply, such as the only one power supply having a voltage of 5V, through the resistance R2 and the resistance R3, and the source of this NMOS transistor 141 is grounded.

As illustrated in FIG. 3, the anode of the diode 142 is electrically connected between the resistance R2 and the resistance R3, and the cathode of the diode 142 is connected to the first radio cable 31. In some implementations, the R2 has a resistance of 1 kΩ and the R3 has a resistance of 3.3 kΩ. The bias voltage of this diode may be 0.8V. When the voltage of the clock signal is high, the NMOS transistor 141 is turned on, and the electrical current can flow from the drain to the source thereof and thus flow through the resistance R2 and R3. The voltage at the second end of the R2 is about 5V*3.3/(3.3+1)=3.8V, and due to the bias voltage of 0.8V, the voltage at the cathode of the diode 142, i.e. the voltage at the first radio cable 31, is about 3V=(3.8−0.8) V.

When the voltage of the clock signal is low, the NMOS transistor 141 is turned off, and the electrical current cannot flow from the drain to the source thereof and thus cannot flow through the resistance R2 and R3. The voltage at the second end of the R2 is about 5V, and due to the bias voltage of 0.8V, the voltage at the cathode of the diode 142, i.e. the voltage at the first radio cable 31, is about 4.2V=(5−0.8)-V.

As discussed above, the high voltage of 4.2V of the modulated power corresponds to the low voltage of the clock signal, and the low voltage 3V of corresponds to the high voltage of the clock signal, and thus the modulated power has alternant high voltage of 4.2V and low voltage of 3V and the same frequency as that of the clock signal. By demodulating the modulated power, the demodulated signal may have the same frequency as that of the clock signal. That is to say, the demodulated clock signal may reproduce the clock signal. Based on the simulation test, there is a time delay between the original clock signal and the demodulated clock signal, but the time delay is much less than duration time of one cycle of the clock signal, and can be negligible with respect to the duration time of one cycle of the clock signal. In some implementations, the NMOS transistor can be replaced with MOSFET so as to further reduce the propagation delay between the original clock signal and the demodulated clock signal.

In this implementation, as illustrated in FIG. 4C, since the output of the LDO 24, which is a constant voltage of 3.3V, is between the high voltage of 4.2V and the low voltage of 3V of the modulated power, the output of the LDO can be used as the reference voltage of the demodulator 22. The circuit for generating the reference voltage can be omitted, and thus the number of the components in the circuit can be reduced.

Figure 5:
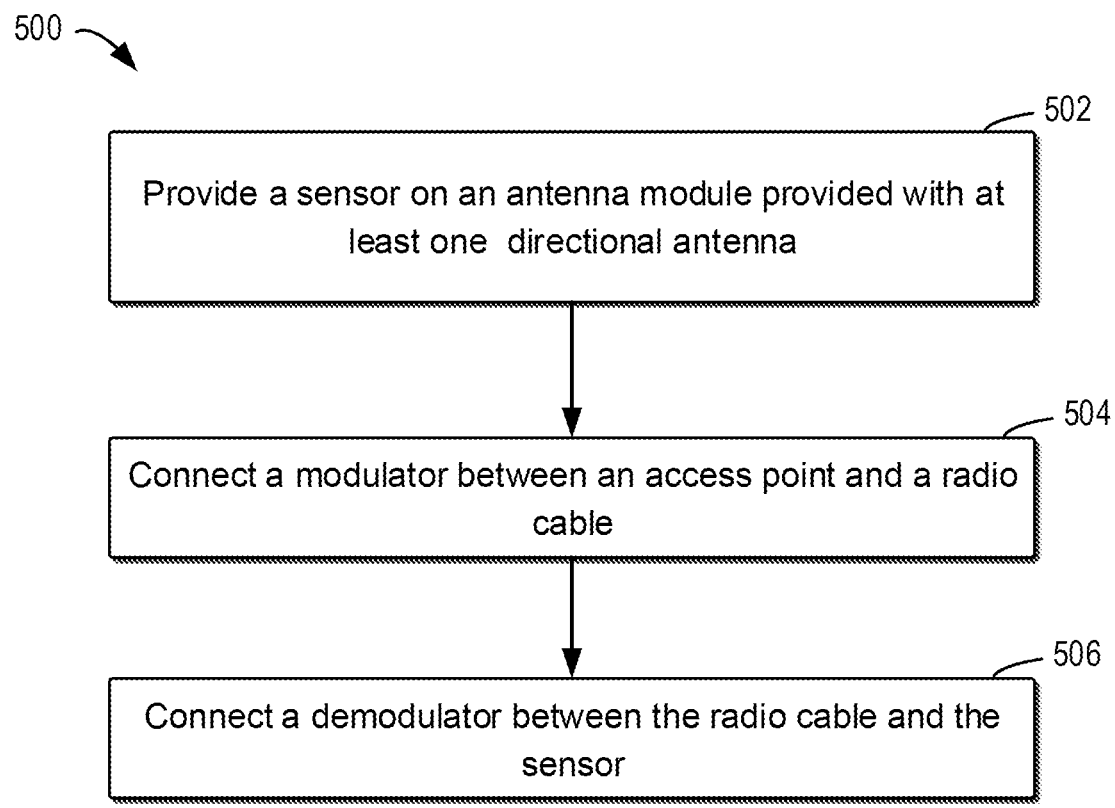
FIG. 5 is a flow chart illustrating an example of a method for forming a system, including an AP, an antenna module, and a radio cable in accordance with some example implementations of the present disclosure.

FIG. 5 is a flow chart illustrating an example of a method 500 for forming a system as shown in FIG. 1, including an access point, an antenna module and a radio cable connected between the access point and the antenna module in accordance with some example implementations of the present disclosure. The method 500 is described in the form of a set of blocks that specify operations that can be performed. However, operations are not necessarily limited to the order shown in FIG. 5 or described herein, for the operations may be implemented in alternative orders or in fully or partially overlapping manners. Also, more, fewer, and/or different operations may be implemented to perform the method 500, or an alternative approach.

At block 502, the method 500 includes providing a sensor 23 on the antenna module 2 provided with at least one directional antenna 21. For example, the sensor 23 is provided to sense the location, the direction, the coverage area, and the like of the directional antenna 21.

At block 504, the method 500 includes connecting a modulator 13 between the AP 1 and the radio cable 31. For example, the modulator 13 is configured to receive a clock signal and a power voltage from the AP 1 and modulate the clock signal and the power voltage into a modulated power to be transmitted over the radio cable 31. The radio cable 31 is designed to transmit the RF signal, and due to the significant difference between the frequency of the RF signal and the frequency of the modulated power, the existing RF cable also can be used to transmit the modulated power without interfering with the RF signal.

At block 506, the method 500 includes connecting a demodulator 22 between the radio cable 31 and the sensor 23. For example, the demodulator 22 is configured to demodulate the modulated power into a demodulated clock signal to be transmitted to the sensor 23. The sensor 23 is configured to receive the demodulated clock signal and the modulated power so as to sense the directional antenna 21.

Since the sensed data should be transmitted to the AP, another cable, for example, another RF cable 32 can be provided between the AP 1 and the antenna module 2 to transmit data. Accordingly, the AP 1 may further comprise a data line, for example, a SDL of the I2C interface, configured to transmit the data to the radio cable 32 and receive the data from the radio cable 32. A Low Dropout Regulator (LDO) 24 may be provided at the antenna module 2, the LDO 24 is configured to receive the modulated power and transform modulated power having alternate first voltage and second voltage to a constant voltage so as to power the sensor 23 such that the sensor 23 can work.

In the method according to the present disclosure, it is possible to deploy compass/declinometer sensors on a 6 GHz panel antenna for AFC requirement and RF visualizations, so as to obtain the location, the direction, the coverage area, and the like of the 6 GHz antenna. Further, by providing the modulator in the AP and the demodulator in the antenna module, the desired signal (such as clock signal) and the power voltage can be modulated at the modulator into a single modulated power, and then the single modulated power can be transmitted to the antenna module over one single RF cable, and then the modulated power received from one single RF cable can be demodulated at the demodulator to a clock signal. Thus, a single existing RF cable, which is designed to transmit an RF signal, can be used to transmit a modulated power, and there is no necessity to provide a dedicated cable to transmit the clock signal and another dedicated cable to supply the power voltage to the sensor.

Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A system, comprising:
   an access point comprising:
      a clock line configured to transmit a clock signal;
      a power supply configured to output a power voltage, wherein the power supply comprises a first power supply having a first voltage and a second power supply having a second voltage lower than the first voltage; and
      a modulator configured to receive the clock signal and the power voltage and modulate the clock signal and the power voltage into a modulated power, wherein the modulator is electrically connected to the first power supply and the second power supply so as to generate the modulated power having the first voltage and the second voltage alternated with each other;
   a radio cable configured to transmit the modulated power; and
   an antenna module comprising:
      a directional antenna;
      a demodulator connected to the radio cable and configured to demodulate the modulated power into a demodulated clock signal; and
      a sensor configured to receive the demodulated clock signal and the modulated power.

2. The system of claim 1, wherein the access point further comprises a data line, and
   the radio cable is a first radio cable, and the system further comprises a second radio cable connected between the data line and the sensor and configured to transmit data between the data line and the sensor.

3. The system of claim 2, wherein the first radio cable and the second radio cable are further configured to transmit a radio frequency signal between the access point and the antenna module; and
   wherein the radio frequency signal has a frequency in a range from 2.4 GHz to 6 GHz, and
   wherein the clock signal has a frequency in a range from 50 kHz to 500 KHz.

4. The system of claim 1, wherein the modulator comprises:
   a first switch connected between the first power supply and the radio cable, and configured to be turned on when a voltage of the clock signal is at one of a high voltage and a low voltage such that the modulated power is at the first voltage; and
   a second switch connected between the second power supply and the radio cable, and configured to be turned on when the voltage of the clock signal is at the other of the high voltage and the low voltage such that the modulated power is at the second voltage.

5. The system of claim 4, wherein the first switch comprises a transistor and a first triode,
   wherein the transistor comprises:
      a gate configured to receive the clock signal such that when the voltage of the clock signal is at one of the high voltage and the low voltage, the transistor is turned on;
      a drain connected to another power supply through a first resistance; and
      a source connected to ground; and
   wherein the first triode comprises:
      a first base electrode connected between the first resistance and the drain of the transistor such that when the transistor is turned on, the triode is turned on;
      a first emitting electrode connected to the first power supply; and
      a first collecting electrode connected to the radio cable; and
   the second switch comprises a second triode,
   wherein the second triode comprises:
      a second base electrode configured to receive the clock signal such that when the voltage of the clock signal is at one of the high voltage and the low voltage, the second triode is turned off;
      a second emitting electrode connected to the second power supply; and
      a second collecting electrode connected to the radio cable.

6. The system of claim 1, wherein the power supply comprises one power supply having a third voltage, and the modulator is electrically connected to the one power supply so as to generate the modulated power having a fourth voltage and a fifth voltage alternated with each other, wherein the fourth voltage is less than the fifth voltage, and the fifth voltage is less than the third voltage.

7. The system of claim 6, wherein the modulator comprises:
a diode connected between the one power supply and the radio cable, wherein an anode of the diode is connected to the one power supply and a cathode of the diode is connected to the radio cable; and
a voltage controller configured to control a voltage at the anode of the diode such that:
when a voltage of the clock signal is at one of the high voltage and the low voltage, the voltage at the anode of the diode is equal to the third voltage of the power supply and the voltage at the cathode of the diode is the fifth voltage, and
when the voltage of the clock signal is at the other of the high voltage and the low voltage, the voltage at the anode of the diode is less than the third voltage of the power supply and the voltage at the cathode of the diode is the fourth voltage.

8. The system of claim 7, wherein the voltage controller comprises a second resistance, a third resistance and a further transistor, wherein the second resistance and the third resistance are connected between the further transistor and the power supply, and the anode of the diode is connected between the second resistance and the third resistance,
wherein the further transistor comprises:
a gate configured to receive the clock signal such that when the voltage of the clock signal is at the other of the high voltage and the low voltage, the further transistor is turned on;
a drain connected to the third resistance; and
a source connected to ground.

9. They system of claim 1, wherein the antenna module further comprises a Low Dropout Regulator (LDO) configured to receive the modulated power and transform modulated power having alternate high voltage and low voltage to a constant voltage so as to power the sensor.

10. A circuit module for a system comprising an access point, an antenna module and a radio cable connected between the access point and the antenna module, comprising:
a modulator connected between the access point and the radio cable and configured to receive a clock signal and a power voltage from the access point and modulate the clock signal and the power voltage into a modulated power to be transmitted over the radio cable, wherein the power voltage comprises a first voltage generated from a first power supply and a second voltage generated from a second power supply, and wherein the modulator is electrically connected to the first power supply and the second power supply so as to generate the modulated power having the first voltage or the second voltage alternated with each other; and
a demodulator connected between the radio cable and the antenna module and configured to demodulate the modulated power into a demodulated clock signal,
wherein the antennal module is provided with at least one directional antenna and at least one sensor to sense the at least one directional antenna, and the at least one sensor is configured to receive the demodulated clock signal and the modulated power.

11. The circuit module of claim 10, wherein the radio cable is a first radio cable, and the system further comprises a second radio cable connected between the access point and the sensor and configured to transmit data between the access point and the sensor,
wherein the first radio cable and the second radio cable are further configured to transmit a radio frequency signal between the access point and the antenna module; and
wherein the radio frequency signal has a frequency in a range from 2.4 GHz to 6 GHz, and
wherein the clock signal has a frequency in a range from 50 kHz to 500 kHz.

12. The circuit module of claim 10, wherein the modulator comprises: a first switch connected between the first power supply and the radio cable and configured to be turned on when a voltage of the clock signal is at one of a high voltage and a low voltage such that the modulated power is at the first voltage; and a second switch connected between the second power supply and the radio cable and configured to be turned on when the voltage of the clock signal is at the other of the high voltage and the low voltage such that the modulated power is at the second voltage.

13. The circuit module of claim 12, wherein the first switch comprises a transistor and a first triode,
wherein the transistor comprises:
a gate configured to receive the clock signal such that when the voltage of the clock signal is at one of the high voltage and the low voltage, the transistor is turned on;
a drain connected to another power supply through a first resistance; and
a source connected to ground; and
wherein the first triode comprises:
a first base electrode connected between the first resistance and the drain of the transistor such that when the transistor is turned on, the triode is turned on;
a first emitting electrode connected to the first power supply; and
a first collecting electrode connected to the radio cable; and
the second switch comprises a second triode,
wherein the second triode comprises:
a second base electrode configured to receive the clock signal such that when the voltage of the clock signal is at one of high voltage and low voltage, the second triode is turned off;
a second emitting electrode connected to the second power supply; and
a second collecting electrode connected to the radio cable.

14. The circuit module of claim 10, wherein the power voltage is generated from a power supply, and
the modulator is electrically connected to the power supply so as to generate the modulated power having a fourth voltage or a fifth voltage alternated with each other, wherein the fourth voltage is less than the fifth voltage, and the fifth voltage is less than the third voltage.

15. The circuit module of claim 14, wherein the modulator comprises:
a diode connected between the power supply and the radio cable, wherein an anode of the diode is connected to the power supply and a cathode of the diode is connected to the radio cable; and
a voltage controller configured to control a voltage at the anode of the diode such that:
when a voltage of the clock signal is at one of the high voltage and the low voltage, the voltage at the anode of the diode is equal to the third voltage of the power supply and the voltage at the cathode of the diode is the fifth voltage, and when the voltage of the clock signal is at the other of the high voltage and the low voltage, the voltage at the anode of the diode is less than the third voltage of the power supply and the voltage at the cathode of the diode is the fourth voltage.

16. The circuit module of claim 15, wherein the voltage controller comprises a second resistance, a third resistance and a further transistor, wherein the second resistance and the third resistance are connected between the further transistor and the power supply, and the anode of the diode is connected between the second resistance and the third resistance, wherein the further transistor comprises:
a gate configured to receive the clock signal such that when the voltage of the clock signal is at the other of the high voltage and the low voltage, the further transistor is turned on;
a drain connected to the third resistance; and
a source connected to ground.

17. The circuit module of claim 10, wherein the antenna module further comprises a Low Dropout Regulator (LDO) configured to receive the modulated power and transform modulated power having alternate high and low voltages to a constant voltage so as to power the at least one sensor.

18. A method of forming a system comprising an access point, an antenna module and a radio cable connected between the access point and the antenna module, the method comprising:

providing a sensor on the antenna module provided with a directional antenna;
connecting a modulator between the access point and the radio cable; and
connecting a demodulator between the radio cable and the sensor,
wherein the modulator is configured to receive a clock signal and a power voltage from the access point and modulate the clock signal and the power voltage into a modulated power to be transmitted over the radio cable, wherein the power voltage comprises a first voltage generated from a first power supply and a second voltage generated from a second power supply, and wherein the modulator is electrically connected to the first power supply and the second power supply so as to generate the modulated power having the first voltage or the second voltage alternated with each other; and
the demodulator is configured to demodulate the modulated power into a demodulated clock signal to be transmitted to the sensor; and
the sensor is configured to receive the demodulated clock signal and the modulated power.

* * * * *